United States Patent
Otsuka et al.

(10) Patent No.: US 8,533,999 B2
(45) Date of Patent: Sep. 17, 2013

(54) WEATHER STRIP

(75) Inventors: Hirofumi Otsuka, Kiyosu (JP); Masatoshi Hotta, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 203 days.

(21) Appl. No.: 12/923,571

(22) Filed: Sep. 28, 2010

(65) Prior Publication Data

US 2011/0072729 A1 Mar. 31, 2011

(30) Foreign Application Priority Data

Sep. 29, 2009 (JP) ................ P2009-224379

(51) Int. Cl.
*E06B 7/16* (2006.01)

(52) U.S. Cl.
USPC ........................................ 49/490.1; 49/498.1

(58) Field of Classification Search
USPC ................... 49/475.1, 498.1, 490.1
See application file for complete search history.

(56) References Cited

U.S. PATENT DOCUMENTS

| | | | | |
|---|---|---|---|---|
| 4,193,605 A * | 3/1980 | Josephson | ...................... | 277/642 |
| 4,318,249 A * | 3/1982 | Landreth | ...................... | 49/490.1 |
| 4,461,507 A * | 7/1984 | Minami et al. | .................. | 296/76 |
| 4,884,370 A * | 12/1989 | Nozaki et al. | ................ | 49/479.1 |
| 4,918,867 A * | 4/1990 | Hayashi et al. | .............. | 49/490.1 |
| 4,959,081 A * | 9/1990 | Mathellier | ...................... | 49/490.1 |
| 4,969,294 A * | 11/1990 | Guillon et al. | ................ | 49/495.1 |
| 4,970,102 A * | 11/1990 | Guillon | ...................... | 428/122 |
| 5,528,864 A * | 6/1996 | Jennings | ...................... | 49/490.1 |
| 5,566,954 A * | 10/1996 | Hahn | ............................. | 277/642 |
| 5,626,383 A * | 5/1997 | Lee et al. | ..................... | 296/146.9 |
| 5,840,401 A * | 11/1998 | Baesecke | ....................... | 428/122 |
| 6,843,024 B2 * | 1/2005 | Nozaki et al. | ................ | 49/490.1 |
| 6,874,281 B2 * | 4/2005 | Fujita et al. | .................. | 49/490.1 |

(Continued)

FOREIGN PATENT DOCUMENTS

| | | |
|---|---|---|
| FR | 2588035 A1 * | 4/1987 |
| JP | 2005-67375 A | 3/2005 |
| JP | 2006-160022 A | 6/2006 |
| JP | 2008-230258 A | 10/2008 |

OTHER PUBLICATIONS

U.S. Appl. No. 12/662,041 (44 pages of specification and 5 sheets of drawings for Figures 1-8).

*Primary Examiner* — Jerry Redman

(74) *Attorney, Agent, or Firm* — McGinn IP Law Group, PLLC

(57) ABSTRACT

A weather strip is provided in which the trim portion does not have an insert member embedded, a notch or a thin wall portions are formed in a portion near the bottom wall of the vehicle exterior sidewall and the vehicle interior sidewall, a thick wall portion is formed in the further front end than the thin wall portion, and both the front ends are inclined so as to approach each other. Two of each of flange holding lips are formed on each of the inner surfaces of both sidewalls; and the angle at which the flange holding lips of the opening side are projected is formed larger than the angle of the flange holding lips of the bottom wall side; the front ends of the flange holding lips of the opening side are formed so as to be contact with or close to each other; the front ends of the flange holding lips 25 and 27 of the bottom wall side are linearly formed to have a gap in the width direction or in a direction orthogonal to the width direction.

3 Claims, 3 Drawing Sheets

(56) References Cited

U.S. PATENT DOCUMENTS

| | | | |
|---|---|---|---|
| 7,017,305 B2* | 3/2006 | Ikuta | 49/498.1 |
| 7,252,294 B2* | 8/2007 | Yamada et al. | 277/641 |
| 7,363,749 B2* | 4/2008 | Sultan et al. | 49/490.1 |
| 2004/0261322 A1* | 12/2004 | Baratin et al. | 49/498.1 |
| 2006/0207186 A1* | 9/2006 | Zwolinski et al. | 49/490.1 |
| 2009/0266000 A1 | 10/2009 | Minoura et al. | |

\* cited by examiner

WEATHER STRIP

BACKGROUND OF THE INVENTION

1. Field of the Invention

The present invention relates to a weather strip that is provided on a flange of a vehicle body opening periphery of an automobile.

2. Related Art

The vehicle body of the automobile has openings such as an engine compartment opening, a door opening, a trunk room opening and the like, and a weather strip is provided on the flange of each of the vehicle body opening peripheries. The weather strips form a seal between the vehicle body opening peripheries and the counterpart members such as the door, the engine hood or the like.

In the case that the weather strip is provided in the vehicle body opening periphery, the weather strip is provided such that the flange of the vehicle body opening periphery is inserted in a trim portion having a substantially U-shaped cross-section of the weather strip.

For example, as shown in FIG. 3, air enters into the engine compartment of the automobile from between the vehicle body 1 and the engine hood 2 at the front side of the automobile during traveling. Meanwhile, rainwater or dust enters into the engine compartment through a cowl louver portion from a windshield 8. At this time, there is a need to prevent the generation of noise due to unnecessary airflow from areas other than the forward side of the front of the automobile, and engine sound coming from the engine compartment to the outside. The weather strip (cowl seal) that is provided on the flange of the cowl louver mounted on the rear end side of the engine compartment seals the gap between the engine compartment and the engine hood preventing the entrance of rainwater and the like into the engine compartment from the backward side of the front.

In order to prevent the generation of the abnormal noise and the entrance of foreign materials, the weather strip is attached to the flange of the cowl louver provided on the vehicle body MD at the peripheral edge of the engine compartment, for example, at the rear end side thereof (for example, see JP-A-2005-67375 and JP-A-2006-160022).

As shown in FIG. 5, the weather strip 110 has a trim portion 120 that is attached to the flange 7 and a hollow seal portion 140 that has a hollow shape and is in contact with the rear surface of the engine hood 2 to form a seal therebetween. The hollow seal portion 140 is in contact with the rear surface of the engine hood 2 so that the opening (an upper portion opening of the engine compartment) is sealed.

The trim portion 120 forms a substantially U-shaped cross-section with the vehicle exterior sidewall 121, a vehicle interior sidewall 122 and a bottom wall 123. An insert member 129 of a metal plate is embedded within the trim portion 120 to reinforce the holding of flange 7.

In the interior portion of the substantially U-shaped cross-section of the trim portion 120, vehicle exterior flange holding lips 124 and 125, and vehicle interior flange holding lips 126 and 127 having an V-shaped cross-section respectively are extended from the inner surface of the vehicle exterior sidewall 121 and the vehicle interior sidewall 122 toward the bottom wall 123 side of the interior portion of the trim portion 120.

With respect to the flange 7 that is provided on four sides of the periphery of the opening of the engine compartment, the flange 7 is inserted into the interior portion of the substantially U-shaped cross-section of the trim portion 120 from the upper direction thereof to provide the weather strip 110 on the flange 7. Vehicle exterior flange holding lips 124 and 125, and vehicle interior flange holding lips 126 and 127 are provided from the inner surface of the trim portion 120 and the holding force is reinforced by the insert member 129. The flange 7 is pinched and held, the orientation of the weather strip 110 is held and is prevented from removal from the flange 7 by the flange holding lips 124, 125, 126 and 127. At this time, the hollow seal portion 140 that is integrally provided on the upper portion of the trim portion 120 is in contact with the rear surface of the outer periphery of the engine hood 2 so as to form a seal between the engine compartment and engine hood 2.

However, to reinforce the holding force of the trim portion 120, the insert member 129 is often formed from metal, so that total weight of the weather strip 110 is increased and consequently does not assist with the need to reduce the weight of the automobile.

The flanges on each of the four sides of the opening of the engine compartment may be separately provided; and the flanges on each of the four sides are not necessarily continuously provided. Thus, even the weather strip 110, which is different from a trunk weather strip, is not formed as a loop but is independently and linearly formed on four sides of the periphery of the opening of the engine compartment, and the end portions thereof are in contact with or close to each other. Accordingly, when a force in the removal direction is applied to the end portion of the weather strip 110, the weather strip is easily removed from the end portion compared to the weather strip 110 that is formed as a loop.

As shown in FIG. 6, a weather strip 210 that is used in the trunk room opening, has a hollow seal portion 240 and a trim portion 220. the insert member made of metal is not embedded within the sidewall or the like of the trim portion 220, and a vehicle exterior sidewall 221, a vehicle interior sidewall 222 and a bottom wall 223 have substantially constant thicknesses respectively, and then are formed of hard rubber material or high hardness resin material (for example, JP-A-2008-230258). The vehicle exterior sidewall 221 and the like have a substantially constant thickness so that stability of the shape is improved during extrusion molding.

However, in this case, because a metal insert member is not embedded, the goal of reducing the weight of the weather strip 210 can be achieved. However, the thickness of the sidewall portion of the trim portion 220 is constant and the trim portion 220 is formed linearly from the bottom wall side to the opening side so that the opening side end portions of the sidewalls of the trip portion 220 are easy to deform in a direction away from each other due to a reaction force from the flange holding lips 225 and 227, and the force with which the trim portion 220 grips the flange 7 is decreased and the trim portion 220 easily separates from the flange 7 in some cases.

When the weather strip 210 is provided in a corner portion of the vehicle body opening portion, because the weather strip 210 is bent, the holding lip 226 and the like are deformed inward (sidewall side of each lip) so that there are cases where the weather strip 210 may be easily removed, seal performance may be degraded, or weather strip 210 (the trim portion 220) often collapses due to a balance of the vehicle interior holding lip 226 and 227, and the body seal lip 228 for draining water.

SUMMARY OF THE INVENTION

An object of the invention is to provide a weather strip for a automobile that is light in weight in response to the need to reduce the weight of the automobile, and in which the shape of the trim portion is stable and the holding force is large toward the flange of the peripheral edge of the vehicle body opening portion.

In an aspect of the invention to solve the above-described problem, a weather strip that is substantially linearly provided on a vehicle body opening including:

a trim portion that is formed in substantially U-shaped cross-section and is attached on a flange of the vehicle body opening; and a hollow seal portion that is integrally formed at the trim portion and is in contact with a counterpart member facing the vehicle body opening so as to form a seal between the vehicle body opening periphery and the counterpart member, wherein the trim portion forms a substantially U-shaped cross-section with a vehicle exterior sidewall, a bottom wall and a vehicle interior sidewall; each of which flange holding lips are extended from inner surface of the vehicle exterior sidewall and the vehicle interior sidewall in the interior portion of the substantially U-shaped cross-section, wherein the trim portion is formed of solid material or microfoam material; in which an insert member is not embedded; a notch or a thin wall portion is formed in a portion of the vehicle exterior sidewall and the vehicle interior sidewall near the bottom wall; a thick wall portion that is a portion of the vehicle exterior sidewall and the vehicle interior sidewall and thicker than the notch or the thin wall portion is formed at a portion that is nearer to the opening side of the substantially U-shaped cross-section than the notch or the thin wall portion; and the front ends of the opening side of the vehicle exterior sidewall and the vehicle interior sidewall are formed so as to gradually narrow the gap toward the front ends, wherein a first vehicle exterior flange holding lip and a first vehicle interior flange holding lip that are located in the opening side of the trim portion, and a second vehicle exterior flange holding lip and a second vehicle interior flange holding lip that are located in the bottom wall, are formed on each of the inner surfaces of the vehicle exterior sidewall and the vehicle interior sidewall, and wherein the angle at which the first vehicle exterior flange holding lip and the first vehicle interior flange holding lip are projected from each of the inner surfaces of the vehicle exterior sidewall and the vehicle interior sidewall is formed larger than the angle at which the second vehicle exterior flange holding lip and the second vehicle interior flange holding lip are projected from each of the inner surfaces thereof; the front ends of the first vehicle exterior flange holding lip and the first vehicle interior flange holding lip are formed so as to be in contact with or close to each other; and the front ends of the second vehicle exterior flange holding lip and the second vehicle interior flange holding lip are respectively formed with a gap in the width direction or in a direction orthogonal to the width direction.

In the aspect of the invention, because the trim portion is formed of, solid material or microfoam material, does not have an insert member embedded, the weight of the weather strip can be reduced and it is possible to contribute to reducing the weight of the automobile. Also, because the trim portion is formed of solid material or microfoam material, it is possible to have a sufficient holding force when the trim portion is attached to the flange of the vehicle body opening.

The thick wall portion that is the portion of the vehicle exterior sidewall and the vehicle interior sidewall and thicker than the notch or the thin wall portion is formed at the portion that is nearer to the opening side of the substantially U-shaped cross-section than the notch or the thin wall portion, and the front ends of the opening side of the vehicle exterior sidewall and the vehicle interior sidewall are formed so that the gap gradually narrows towards the front ends. Thus, when the trim portion is provided on the flange, the trim portion is deformed such that the thick wall portion of the front portion is further expanded rather than the bottom portion with the notch or the thin wall portion as a base point. The joint portion of both sidewalls is combined with the bottom wall so that the substantially U-shaped cross-section can be maintained. The stiffness of the trim portion can be secured, the removal load of the trim portion from the flange can be increased and the trim portion can be made difficult to remove. Also, according to the above-described configuration, when a force is applied to the hollow seal portion in a direction where the trim portion is drawn up, because the front ends of both sidewalls of the trim portion are deformed in a direction where the front ends come closer to each other, the trim portion can be made more difficult to remove from the flange.

The first vehicle exterior flange holding lip and the first vehicle interior flange holding lip that are located in the opening side of the trim portion, and the second vehicle exterior flange holding lip and the second vehicle interior flange holding lip that are located in the bottom wall, are formed on each of the inner surfaces of the vehicle exterior sidewall and the vehicle interior sidewall. Thus, the flange can be reliably maintained with two holding lips that are formed on each sidewall.

The angle at which the first vehicle exterior flange holding lip and the first vehicle interior flange holding lip are projected from each of the inner surfaces of the vehicle exterior sidewall and the vehicle interior sidewall is formed larger than the angle at which the second vehicle exterior flange holding lip and the second vehicle interior flange holding lip are projected from each of the inner surfaces thereof; the front ends of the first vehicle exterior flange holding lip and the first vehicle interior flange holding lip are formed so as to be in contact with or close to each other. Thus, after the weather strip is linearly provided on the flange, when the tensile force is applied on the hollow seal portion of both ends the weather strip, the front end of the first vehicle exterior flange holding lip and the front end of the first vehicle interior flange holding lip are in close contact with respect to the side surface of the flange, a reversing amount increases and the removing force from the flange can be made large.

Because the front ends of the second vehicle exterior flange holding lip and the second vehicle interior flange holding lip are formed with the gap in the width direction or in the direction orthogonal to the width direction, when the trim portion is provided on the flange, the front end of the flange can easily inserted between the second vehicle exterior flange holding lip and the second vehicle interior flange holding lip. The insertion load can be decreased compared to forming the front ends at the same projection angle as that of the first flange holding lip.

In a second aspect of the invention, the thick wall portion of the sidewall of the trim portion is formed with entasis or is barrel shaped in cross-section.

According to the second aspect of the invention, the cross-section of the thick wall portion is formed with entasis or is barrel-shaped, so that the stiffness of the thick wall portion can be secured. Meanwhile, surplus portions that have little influence on the stiffness are decreased, so that it is possible to contribute to the light weight of the automobile and cost reduction of the material.

In a third aspect of the invention, the trim portion is formed of solid material or microfoam material having a hardness corresponding to an International Rubber Hardness (IRHD) of 80 degrees to 95 degrees; and the flange holding lip is formed of solid material or microfoam material having a hardness corresponding to an International Rubber Hardness (IRHD) of 50 degrees to 75 degrees.

According to the third aspect of the invention, because the trim portion is formed of solid material or microfoam material having a hardness corresponding to an International Rubber Hardness (IRHD) of 80 degrees to 95 degrees, even if the insert is not embedded in the trim portion, the trim portion may have a sufficient flange holding force without the opening of the trim portion being enlarged.

Because the flange holding lip is formed of solid material or microfoam material having the hardness corresponding to an International Rubber Hardness (IRHD) of 50 degrees to 75 degrees, when the flange is inserted, the flange is deformed with the holding lip as the center. In addition, since the deforming force is not large, the opening of the trim portion is not enlarged, and the shape is secured, the trim portion may have a sufficient flange holding force.

According to the aspects of the invention, since the notch or the thin wall portion is formed at the portion that is close to the bottom wall of the vehicle exterior sidewall and the vehicle interior sidewall, the thick wall portion is formed at the further front end portion than the thin wall portion or the like, and the front ends are inclined and formed so as to come close to each other. Therefore, the shape of the trim portion can be secured and it is possible to obtain a sufficient flange holding force.

The angle at which the first vehicle exterior flange holding lip and the first vehicle interior flange holding lip are projected from each of the inner surfaces of the vehicle exterior sidewall and the vehicle interior sidewall is formed larger than the angle at which the second vehicle exterior flange holding lip and the second vehicle interior flange holding lip are projected, so that when the tensile force is applied on the hollow seal portion of both ends of the linear-shaped weather strip, the front end of the first flange holding lip is in close contact with respect to the side surface of the flange, the reversing amount increases and the removing force of the flange can be made large.

DETAILED DESCRIPTION OF THE PREFERRED EMBODIMENTS

The embodiments of the invention will be described with reference to FIGS. 1 to 4.

Figure 1:
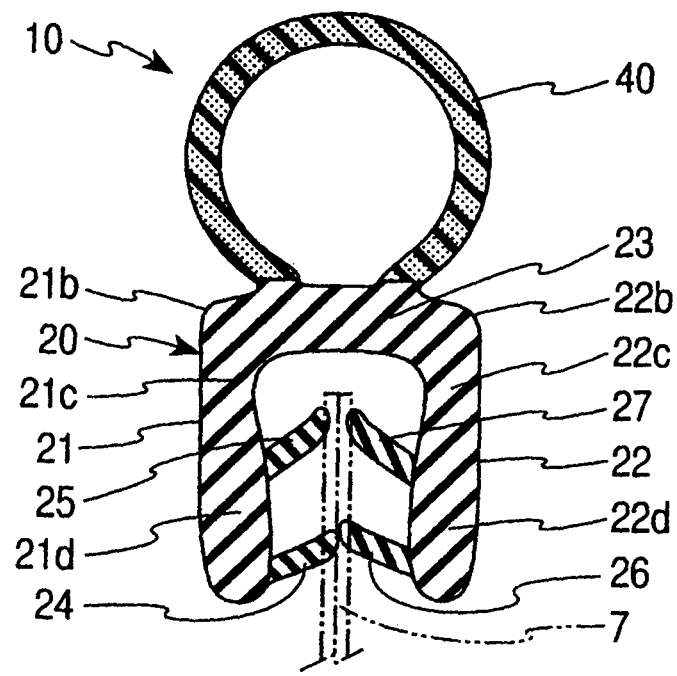
FIG. 1 is a sectional view of a weather strip of a first embodiment of the invention.
Figure 2:
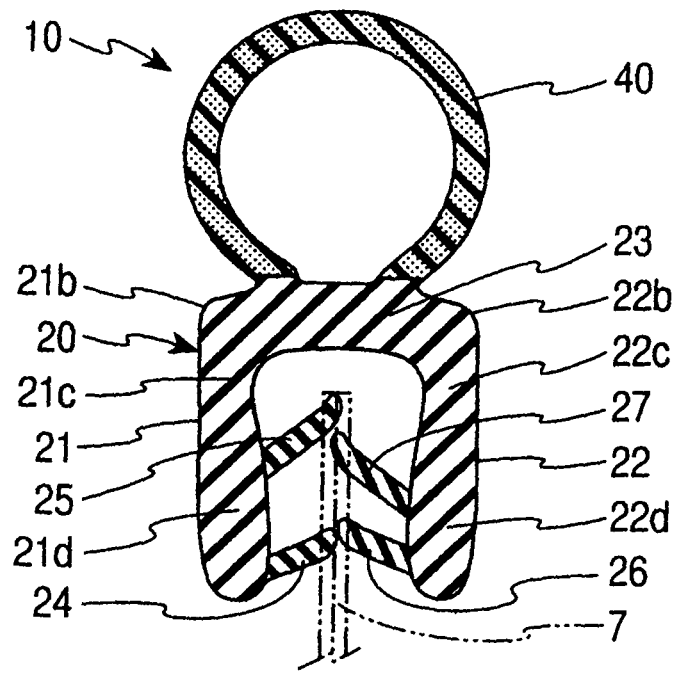
FIG. 2 is a sectional view of a weather strip of a second embodiment of the invention.
Figure 3:
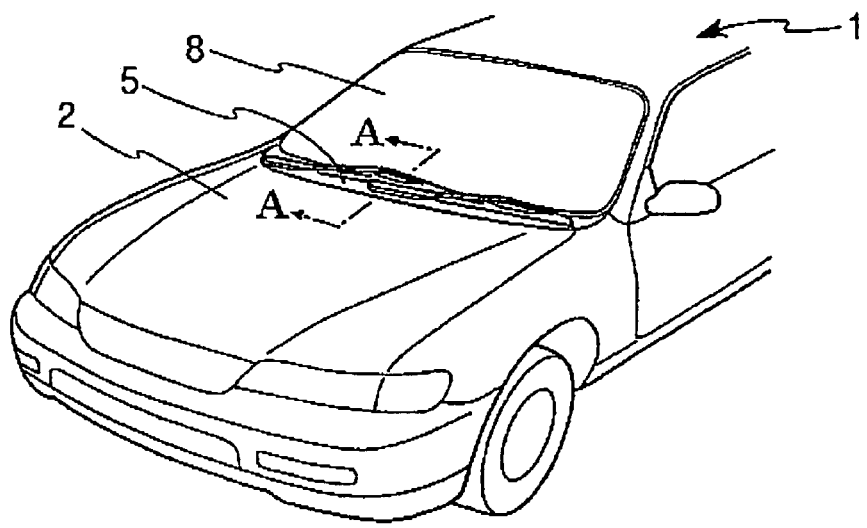
FIG. 3 is a schematic perspective view showing an automobile when seen from oblique above.
Figure 4:
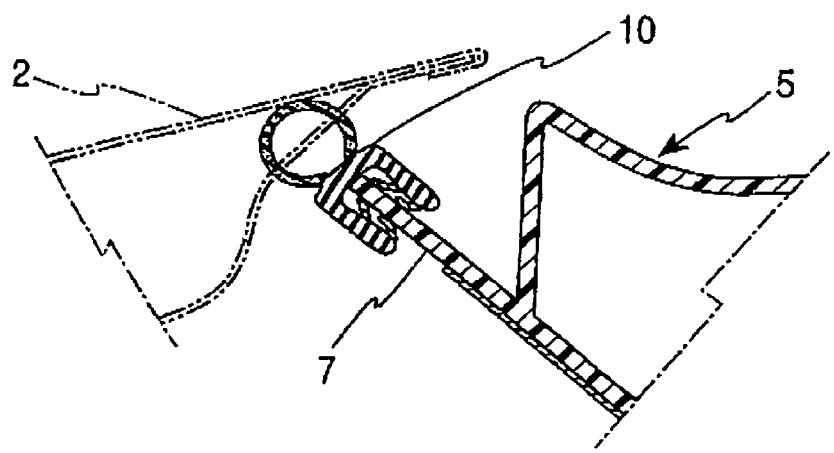
FIG. 4 is a sectional view showing a state in which a weather strip is attached to a flange of a rear side of an engine compartment, and taken along the line A-A in FIG. 3.
Figure 5:
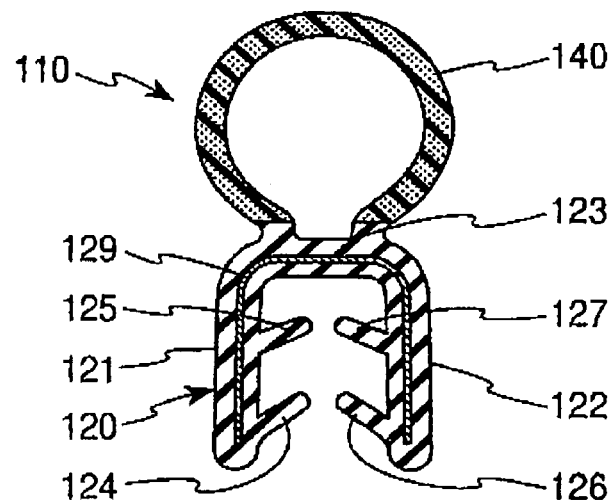
FIG. 5 is a sectional view showing another conventional weather strip.
Figure 6:
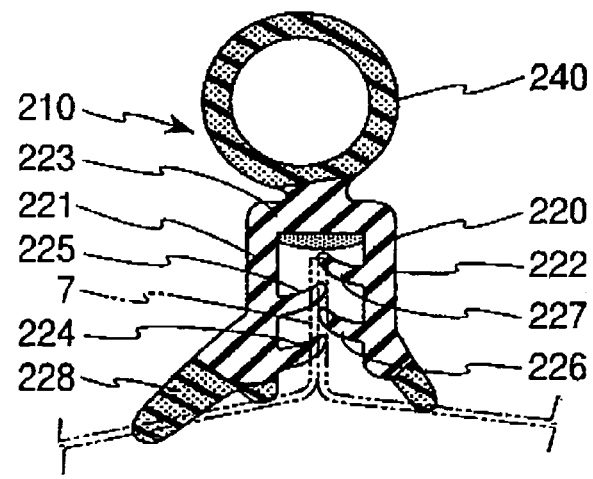
FIG. 6 is a sectional view showing another conventional weather strip.

FIG. 1 is a sectional view of a weather strip 10 of a first embodiment of the invention. Similarly, FIG. 2 is a sectional view of a weather strip of a second embodiment of the invention. FIG. 3 is a schematic perspective view showing an automobile when seen from oblique above. FIG. 4 is a sectional view showing a state in which a weather strip is attached to a flange of a rear side of an engine compartment, and taken along the line A-A in FIG. 3.

The first embodiment of the invention will be described as an example in which the weather strip 10 is used in a cowl seal that is linearly provided on one side of the rear side of a periphery of the engine compartment. The invention can be widely used as a weather strip that seals openings of an automobile, such as a door opening of the automobile, a roof opening, rear trunk, and rear door weather strip.

As shown in FIG. 1, the weather strip 10 of the first embodiment of the invention consists of a trim portion 20 that is attached to the flange 7 and a hollow seal portion 40 that is in contact with and seals the engine hood 2.

A trim portion 20 forms a substantially U-shaped cross-section with a vehicle exterior sidewall 21, a vehicle interior sidewall 22 and a bottom wall 23. An insert member that is made up of a bone particle of metal plate and the like is not embedded within a wall of the vehicle exterior sidewall 21, the vehicle interior sidewall 22 and the bottom wall 23, and is formed in an elastomer material. The elastomer material is formed of rubber or hard material of a thermoplastic elastomer (microfoam material or solid material having a hardness corresponding to an International Rubber Hardness (IRHD) of 80 degrees to 95 degrees. The elastomer material will be described below.

Thin wall portions 21c and 22c are formed at a portion near the bottom wall of the vehicle exterior sidewall 21 and the vehicle interior sidewall 22. Notches may be formed instead of thin wall portions 21c and 22c. In the embodiment, the thickness of thin wall portions 21c and 22c are about 2 mm.

Thick wall portions 21d and 22d that is a portion of the vehicle exterior sidewall 21 and the vehicle interior sidewall 22 and thicker than thin wall portions 21c and 22c or notches are formed at a portion that is nearer to the opening side of substantially U-shaped cross-section than thin wall portions 21c and 22c or notches. Thick wall portions 21d and 22d are formed with entasis or is barrel-shaped in cross-section and the thickest portion is 2.5 mm. Thus, the stiffness of the thick wall portions 21d and 22d is maintained and the weight of the weather strip 10 can be decreased.

In a portion that is continuous between thin wall portions 21c and 22c, and thick wall portions 21d and 22d, each of front ends of the vehicle exterior sidewall 21 and the vehicle interior sidewall 22 is curved so as to approach each other. In other words, each of thick wall portions 21d and 22d of the vehicle exterior sidewall 21 and the vehicle interior sidewall 22 is inclined in an angle of about 8 degrees to the inside direction of the trim portion 20 from the vertical direction with thin wall portions 21c and 22c as the base point. Also, the inclined angle is preferably set in a range of 5 degrees to 10 degrees.

Accordingly, the front ends of the opening side of the vehicle exterior sidewall 21 and the vehicle interior sidewall 22 are formed so as to gradually narrow a gap toward the front ends and the force with which the trim portion 20 tightly pinches the flange becomes large toward the front end.

A first vehicle exterior flange holding lip 24 that is located in the opening side of U-shaped cross-section of the trim portion 20 is formed and a second vehicle exterior flange holding lip 25 that is located on the bottom wall of the interior portion of the trim portion 20 is formed on the inner surface of the vehicle exterior sidewall 21.

On inner surface of the vehicle interior sidewall 22, two corresponding flange holding lips are formed opposite to the first vehicle exterior flange holding lip 24 and the second vehicle exterior flange holding lip 25. A first vehicle interior flange holding lip 26 is formed on the opening side and a second vehicle interior flange holding lip 27 is formed on the bottom wall 23 side. As shown in the drawings, all the flange holding lips 24, 25, 26 and 27 are formed to project from the thick portions 21d and 22d of both sidewalls 21 and 22.

The angle at which the first vehicle exterior flange holding lip 24 and the first vehicle interior flange holding lip 26 are projected from the inner surface of each of the thick wall portions 21d and 22d of the front ends of the vehicle exterior sidewall 21 and the vehicle interior sidewall 22 is formed larger than the angle at which the second vehicle exterior flange holding lip 25 and the second vehicle interior flange holding lip 27 are projected from each of the inner surfaces thereof. In the embodiment, an angle at which the first vehicle exterior flange holding lip 24 and the first vehicle interior flange holding lip 26 are projected from the inner surface of each of the vehicle exterior sidewall 21 and the vehicle interior sidewall 22 is 60 degrees, and an angle at which the second vehicle exterior flange holding lip 25 and the second vehicle interior flange holding lip 27 are projected from each of the inner surfaces thereof is 45 degrees.

Because the flange holding lips are provided in such angles, after the weather strip 10 is linearly provided on the flange 7, in the case that the hollow seal portion 40 is attached to the rear surface of the engine hood 2 for some reason, a force that pulls the hollow seal portion 40 of the weather strip 10 in the upward direction is applied when the engine hood 2 is opened. At this time, the front end of the first vehicle exterior flange holding lip 24 and the front end of the first vehicle interior flange holding lip 26 are in close contact with respect to the side surface of the flange 7 so that the reversing amount increases and a force that resists the removal of the flange 7 can be made large.

At this time, because both sidewalls 21 and 22 are inclined and formed so as to come close to each other, when the tensile force acts in the hollow seal portion 40 in the upward direction, the force acts on the front ends of both sidewalls 21 and 22 in a direction to come close to each other. Therefore, the force resisting the removal of the flange 7 can be made large.

When the force resisting the removal of the flange 7 is larger than the fixing force to the rear surface of the engine hood 2 of the hollow seal portion 40, the engine hood 2 is opened in the state where the attachment is released and the weather strip 10 is maintained on the flange 7 at a predetermined position.

In the first embodiment, the front end of the first vehicle exterior flange holding lip 24 and the front end of the first vehicle interior flange holding lip 26 come in contact with each other, and the front end of the second vehicle exterior flange holding lip 25 and the front end of the second vehicle interior flange holding lip 27 are formed to have a gap therebetween. Thus, when the trim portion 20 is provided on the flange 7, a root of the flange 7 can be pinched by the front end of the first vehicle exterior flange holding lip 24 and the front end of the first vehicle interior flange holding lip 26, and a front end of the flange 7 can be pinched by the front end of the second vehicle exterior flange holding lip 25 and the front end of the second vehicle interior flange holding lip 27.

Accordingly, the stiffness can be secured by the thick wall portions 21d and 22d. As the angle between the front end of the first vehicle exterior flange holding lip 24 and the front end of the first vehicle interior flange holding lip 26 become large, the load for removal from the flange of the trim portion increases and it is possible to make it difficult to remove.

Because the front end of the second vehicle exterior flange holding lip 25 and the front end of the second vehicle interior flange holding lip 27 are formed to have the gap in width direction, when the trim portion 20 is provided on the flange 7, the front end of the flange 7 easily enters between the second vehicle exterior flange holding lip 25 and the second vehicle interior flange holding lip 27, and the insertion load can be decreased.

The reaction force against the second vehicle exterior flange holding lip 25 and the second vehicle interior flange holding lip 27 from the flange 7 decreases, the force to open the end portion of the opening side of the trim portion 20 weakens, and the trim portion 20 can stably be provided on the flange 7. Specifically, similarly to the embodiment, in the weather strip 10 which is linearly provided, the trim portion 20 tends to open easily at the end portion. However, since the embodiment of the invention has the configuration described above, the shape of the trim portion 20 is stable even at the end portion, and the holding force of the flange can be secured.

The vehicle exterior flange holding lips 24 and 25 and the vehicle interior flange holding lips 26 and 27 are formed in the same material as that of the vehicle exterior sidewall 21 and the like in the same manner as described above, and the hardness of the material preferably corresponds to International Rubber Hardness (IRHD) of 70 degrees. The material can be made in the range of the International Rubber Hardness (IRHD) of equal to or more than 50 degrees and less than 75 degrees. In this case, the holding lips have a sufficient flexibility to flexibly come in contact with the flange 7 and have a sufficient hardness to maintain the flange 7 even when the surface of the flange 7 has convex and concave, or the like.

The vehicle exterior sidewall 21 and the bottom wall 23 are connected through the corner portion and an angular portion 21b that is outside of the corner portion is preferably formed such that the angle between the vehicle exterior sidewall 21 and the bottom wall 23 is 90 degrees to 95 degrees. The vehicle interior sidewall 22 and the bottom wall 23 are also connected through the corner portion and an angular portion 22b that is outside of the corner portion is preferably formed such that an angle between the vehicle interior sidewall 22 and the bottom wall 23 is 90 degrees to 95 degrees. In the embodiment, the angle of the angular portions 21b and 22b is 95 degrees. In this case, each angle of the corner portions is formed as a right angle or an obtuse angle near the right angle, the stiffness of the corner portions of the vehicle exterior sidewall 21 and the vehicle interior sidewall 22 is improved and the flange holding lips 24, 25, 26 and 27 of the trim portion 20 can easily hold the front end of the flange 7.

In the angular portion 21b of outside surface of the corner portion of the vehicle exterior sidewall 21 and the bottom wall 23 and the angular portion 22b of outside surface of the corner portion of the vehicle interior sidewall 22 and the bottom wall 23, the radius of curvature thereof is preferably about 0.5 mm. In this case, the stiffness of both corner portions is improved, and due to the stiffness of the thick wall portions 21d and 22d, the vehicle exterior sidewall 21 and the vehicle interior sidewall 22 do not open with the corner portion as the center, the force with which the vehicle exterior sidewall 21 and the vehicle interior sidewall 22 which are formed of hard material pinches the flange 7 increases, and the trim portion 20 is not removed from the flange 7 although the insert member is not embedded.

The vehicle exterior flange holding lip 24 and the vehicle interior flange holding lip 26 are preferably formed at the front end closest to the opening side of each inner surface of the vehicle exterior sidewall 21 and the vehicle interior sidewall 22. In this case, the gap between the first vehicle exterior flange holding lip 24 and the second vehicle exterior flange holding lip 25, and the gap between the first vehicle interior flange holding lip 26 and the second vehicle interior flange holding lip 27 is widened, the width that holds the flange 7 is widened, and the flange 7 is stably maintained.

In the weather strip 10 of the embodiment, the insertion load toward the flange 7 is about 12N/100 mm, and the removal load from the flange 7 is about 50N/100 mm. The insertion load of the weather strip in which conventional insert member is embedded, is about 10N/100 mm, and the removal load is about 55N/100 mm. As described above, the weather strip 10 of the invention, compared to the conventional weather strip, has similar values in consideration of both of the removing load and the inserting load. The insertability toward the flange 7 is excellent as the inserting load is small, and the holding force is sufficient.

In the embodiment, the vehicle exterior sidewall 21, the bottom wall 23 and the vehicle interior sidewall 22 are formed of rubber or thermoplastic elastomer which is hard elastomer material corresponding to the International Rubber Hardness (IRHD) of 90 degrees. Thus, the stiffness of whole trim portion 20 increases and the force that pinches the flange 7 with the vehicle exterior sidewall 21 and the vehicle interior sidewall 22 is large even though the insert member is not embedded therein. Also, the hard material is formed by the extrusion molding without the insert, the extrusion molding is easily performed and the productivity is high.

The vehicle exterior sidewall 21, the bottom wall 23 and the vehicle interior sidewall 22 of the weather strip 10 are preferably formed in EPDM rubber or olefin-based thermoplastic elastomer, and the hardness thereof corresponds to an International Rubber Hardness (IRHD) of equal to or more than 80 degrees and equal to or less than 95 degrees. In this case, it is possible to obtain sufficient stiffness to pinch the flange 7.

The hollow seal portion 40 is formed at the outer surface of the bottom wall 23 of the trim portion 20 toward the upper direction. The hollow seal portion 40 is hollow and is substantially rhombus-shaped, substantially oval-shaped or substantially circle-shaped, and can be formed of sponge material. Because it is hollow, it has flexibility, and when the engine hood 2 is closed, the hollow seal portion 40 is not abnormally deformed compared to the lip shape. Thus, it is possible to reliably come in contact with the engine hood 2 at a predetermined position and can seal the engine hood. In the case that the cross-section of the hollow seal portion 40 is rhombus-shaped or oval-shaped, when the front end of the hollow seal portion 40 comes in contact with the engine hood 2, an swelling position at the center portion of the substantial rhombus-shaped or oval-shaped portion is bent so that flexible contact can be made.

In the case that the hollow seal portion 40 is formed of sponge material, when the hollow seal portion 40 comes in contact with the engine hood 2 that is the counterpart member to be sealed, the flexibility is great and the front end can reliably come in contact according to the shape of the engine hood 2, and the seal performance is high.

When the trim portion 20 is provided on the flange 7, as described above, the flange 7 is held by the first vehicle exterior flange holding lip 24 and the second vehicle exterior flange holding lip 25, and the first vehicle interior flange holding lip 26 and the second vehicle interior flange holding lip 27, so that the weather strip 10 maintains its orientation in stable.

Thus, the hollow seal portion 40 that is integrally formed to the upper portion of the outside surface of the trim portion 20 reliably comes in contact with the rear surface of the engine hood 2 and it is possible to form a seal between the engine hood 2 and the vehicle body opening periphery.

The sponge material of the hollow seal portion 40 is formed of rubber foam material having a specific gravity of 0.4. The sponge material can be formed of rubber foam material having the specific gravity of equal to or more than 0.3 and equal to or less than 0.6. In this case, because the sponge material is formed of rubber foam material having the specific gravity of equal to or more than 0.3 and equal to or less than 0.6, the weight of the weather strip 10 can be decreased, it is possible to obtain high elasticity and flexibility, and secure the seal performance even over a long period of use.

Next, the second embodiment of the invention will be described with reference to FIG. 2.

Since the second embodiment has different shape to the second vehicle exterior flange holding lip 25 and the second vehicle interior flange holding lip 27 of the trim portion 20 compared to the first embodiment, and the remaining portions are the same as those of the first embodiment, the description of similar portions will be omitted and a description will be made of the differing portions.

The front end of the second vehicle exterior flange holding lip 25 is located nearer to the bottom wall 23 side than the front end of the second vehicle interior flange holding lip 27, and a gap is formed in a direction orthogonal to the width direction, in other words, the vertical direction in FIG. 2 between the front end of the second vehicle exterior flange holding lip 25 and the front end of the second vehicle interior flange holding lip 27. Thus, when the trim portion 20 is provided on the flange 7, the front end of the flange 7 easily approaches while dividing the second vehicle exterior flange holding lip 25 and the second vehicle interior flange holding lip 27 into both sides, and thus the insertion load can be made small.

On the inner surface of the vehicle exterior sidewall 21, when the second vehicle exterior flange holding lip 25 that is formed on the bottom wall 23 side of the inside of the trim portion 20 is attached to the flange 7, the second vehicle exterior flange holding lip 25 is preferably formed at the nearest point to the bottom wall 23 such that the front end of the second vehicle exterior flange holding lip 25 does not come in contact with the inner surface of the bottom wall 23. In this case, when the trim portion 20 is attached to the flange 7, the front end of the flange 7 can be inserted deep inside the trim portion 20, and the front ends of the second vehicle exterior flange holding lip 25 and the second vehicle interior flange holding lip 27 can reliably hold the flange 7.

The front end of the first vehicle exterior flange holding lip 24 and the front end of the second vehicle exterior flange holding lip 25, and the front end of the first vehicle interior flange holding lip 26 and the front end of the second vehicle interior flange holding lip 27 are extended longer than other front ends in the sidewall direction of a counterpart side. Thus, before the flange 7 is inserted, the front ends does not come in contact with each other, and is located within the trim in a overlapping manner at a predetermined interval in the vertical direction. When the flange 7 is inserted into the trim portion 20, the bending amount of the front end of each of the flange holding lips increases, the force that holds the flange 7 increases, and thus it is possible to prevent the trim portion 20 from being removed from the flange 7.

In the forming of the weather strip 10 of the invention, a synthetic rubber having the above-described hardness, and a thermoplastic elastomer are used, and for example, an EPDM rubber may be used as the synthetic rubber, and a polyolefin-based elastomer and the like may be used as the thermoplastic elastomer. In the case where the EPDM rubber and the polyolefin-based elastomer are used, the same kind of materials can be used, extrusion molding can be performed simultaneously, and weather resistant products can be obtained. Also, it can be recycled without separation due to the same kind of olefin-based resin and rubber, and easily recycled products can be obtained.

The linear portion of the weather strip 10 is formed by the extrusion-molding machine, is cut into predetermined lengths and then fabricated. The portion that is provided on the corner portion is formed by a molding die and the linear portion thereof is simultaneously connected using the molding die.

In the case of the synthetic rubber, after extrusion molding, it is transferred to a vulcanization bath and is heated by hot air or high-frequency waves or the like and vulcanized. In the case of the thermoplastic elastomer, it is cooled and solidified.

What is claimed is:

1. A weather strip that is substantially linearly provided on a vehicle body opening comprising:
    a trim portion that is formed in substantially U-shaped cross-section and is attached on a flange of the vehicle body opening; and a hollow seal portion that is integrally formed at the trim portion and contacts a counterpart member facing the vehicle body opening so as to form a seal between the vehicle body opening periphery and the counterpart member,
    wherein the trim portion forms a substantially U-shaped cross-section with a vehicle exterior sidewall, a bottom wall and a vehicle interior sidewall; each of which flange holding lips are extended from the inner surface of the vehicle exterior sidewall and the vehicle interior sidewall in the interior portion of the substantially U-shaped cross-section,
    wherein the trim portion is formed of solid material or a microfoam material; in which an insert member is not embedded; a notch or a thin wall portion is formed in a portion of the vehicle exterior sidewall and the vehicle interior sidewall near the bottom wall; a thicker wall portion that is a portion of the vehicle exterior sidewall and the vehicle interior sidewall and is thicker than the notch or the thin wall portion is formed at a portion adjacent to the notch or the thin wall portion and extends to the opening side of the substantially U-shaped cross-section; and the front ends of the opening side of the vehicle exterior sidewall and the vehicle interior sidewall are formed so as to gradually narrow the gap toward the front ends,
    wherein a first vehicle exterior flange holding lip and a first vehicle interior flange holding lip that are located in the opening side of the trim portion, and a second vehicle exterior flange holding lip and a second vehicle interior flange holding lip that are located in the bottom wall, are formed on each of the inside surfaces of the vehicle exterior sidewall and the vehicle interior sidewall, and
    wherein the angle at which the first vehicle exterior flange holding lip and the first vehicle interior flange holding lip are projected from each of the inside surfaces of the vehicle exterior sidewall and the vehicle interior sidewall is formed larger than the angle at which the second vehicle exterior flange holding lip and the second vehicle interior flange holding lip are projected from each of the inner surfaces thereof; the front ends of the first vehicle exterior flange holding lip and the first vehicle interior flange holding lip are formed so as to be in contact with or close to each other; and the front ends of the second vehicle exterior flange holding lip and the second vehicle interior flange holding lip are respectively formed with a gap in a width direction or in a direction orthogonal to the width direction.

2. The weather strip according to claim 1, wherein the thicker wall portion of the sidewall of the trim portion is formed with entasis or is barrel-shaped in cross-section.

3. The weather strip according to any one of claims 1, wherein the trim portion is formed of solid material or microfoam material having a hardness corresponding to an International Rubber Hardness (IRHD) of 80 degrees to 95 degrees; and the flange holding lip is formed of solid material or microfoam material having a hardness corresponding to an International Rubber Hardness (IRHD) of 50 degrees to 75 degrees.

* * * * *